United States Patent
Saint-Jalmes et al.

(10) Patent No.: US 7,290,735 B2
(45) Date of Patent: Nov. 6, 2007

(54) LAYOUT OF THE TOP PART OF AN AIRCRAFT CABIN

(75) Inventors: Bruno Saint-Jalmes, Toulouse (FR); André Rezag, Toulouse (FR); Jazon Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 11/188,703

(22) Filed: Jul. 26, 2005

(65) Prior Publication Data

US 2006/0113427 A1    Jun. 1, 2006

Related U.S. Application Data

(60) Provisional application No. 60/606,522, filed on Sep. 2, 2004.

(51) Int. Cl.
*B64D 11/06* (2006.01)

(52) U.S. Cl. .............. 244/118.6; 244/118.5; 5/9.1; 105/316

(58) Field of Classification Search ............. 244/118.5, 244/119, 118.6; 5/9.1; 105/316
See application file for complete search history.

(56) References Cited

U.S. PATENT DOCUMENTS

| | | | | |
|---|---|---|---|---|
| 3,784,989 A | * | 1/1974 | LeGrand ............. | 105/316 |
| 4,066,227 A | * | 1/1978 | Buchsel ............. | 244/118.6 |
| 4,071,210 A | | 1/1978 | Mutke | |
| 4,589,612 A | * | 5/1986 | Halim .............. | 244/118.6 |
| 6,073,883 A | | 6/2000 | Ohlmann et al. | |
| 6,155,519 A | * | 12/2000 | Rajasingham ........... | 244/118.6 |
| 6,464,169 B1 | | 10/2002 | Johnson et al. | |
| 6,536,710 B1 | | 3/2003 | Bobzien et al. | |
| 7,077,360 B2 | * | 7/2006 | Jacob .............. | 244/118.5 |
| 2002/0033432 A1 | | 3/2002 | Mikosza | |
| 2003/0029967 A1 | | 2/2003 | Mills | |

FOREIGN PATENT DOCUMENTS

| | | |
|---|---|---|
| EP | 0 514 650 | 11/1992 |
| EP | 0 901 964 | 3/1999 |
| EP | 1 279 592 | 1/2003 |

\* cited by examiner

*Primary Examiner*—J. Woodrow Eldred
(74) *Attorney, Agent, or Firm*—Oblon, Spivak, McClelland, Maier & Neustadt, P.C.

(57) ABSTRACT

An aircraft cabin that includes a main structure being the structure of the aircraft and enclosing the cabin; a bridge forming a flat surface on which the seats are secured; an aisle extending longitudinally in cabin and elevated with respect to bridge, and beds or cots accessed by said aisle and arranged above seats of bridge, transversally with respect to aisle and on both sides of such aisle.

18 Claims, 4 Drawing Sheets

LAYOUT OF THE TOP PART OF AN AIRCRAFT CABIN

CROSS REFERENCE TO RELATED APPLICATIONS

This application is based upon and claims priority under 35 U.S.C. §119 from French Patent Application No. 0408239, filed Jul. 26, 2004 and under 35 U.S.C. §119(e) from U.S. Provisional Application No. 60/606,522, filed Sep. 2, 2004.

BACKGROUND OF THE INVENTION

This invention involves the layout of the top part of an aircraft cabin.

The technical domain of the invention involves the transportation of passengers in an airplane. In a given space, the cabin of an airplane, as many passengers as possible must be placed while giving them optimal comfort. Usually, three classes of comfort are offered: first class, business class and coach. In first class and business class, the seats offered to the travelers are most often convertible seats that offer in an initial position, a seat to the passenger and in another position, a cot or bed, more or less inclined in business class. Various solutions are known for this state of the art to propose also sleepers to the travelers in coach class. As such, it has been proposed to use several seats to transform them into raised beds or cots. In general, the number of beds obtained is fewer than the number of seats. For the known solutions, in general, there are two seats for one sleeper.

The idea that led to this invention is to use the space on top of the aircraft cabin for the beds or cots. The problem is to be able to provide a large number of beds.

Documents of the prior state of the art have already proposed to use the top space of the cabin of an airplane. As such, document EO-0 901 964 proposes to arrange in this top space, beds with an aisle in between. As can be seen on the illustrations of this document, the number of beds is very limited. The use of these beds is as a result rather reserved for navigating personnel. Another document, more recent, document U.S. Pat. No. 6,619,589 also proposes a similar configuration.

SUMMARY OF THE INVENTION

The purpose of this invention is as such to provide a large number of sleepers in the top space of the cabin of an airplane.

For that purpose, it proposes an airplane cabin destined for the transportation of passengers comprising:
  a principal structure corresponding to the airplane structure and enclosing the cabin;
  a bridge forming a flat surface on which seats are secured;
  an aisle extending longitudinally in the cabin and raised with respect to the bridge, and
  beds that can be accessed from said aisle and arranged above the seats secured to the bridge.

According to this invention, the beds that can be accessed via the raised aisle are arranged transversally with respect to the aisle and on both sides of said aisle.

Thanks to this configuration, a much larger number of beds can be positioned on the top part of the cabin in comparison with the layout of the beds for the prior state of the art.

The invention proposes also a form of preferred design in which the beds are suspended on the side of the central aisle of the principal structure of the cabin and are linked on the opposite side of the aisle to this same structure. The components that then support the beds can have a light-weight structure and can also be very sturdy because they are attached to the main cabin structure. For this form of design, one can provide for instance that the beds are supported by L-shaped structural components, with a first leg of the L extending considerably in parallel to the bridge and having a length considerably equal to the length of a bed while the other leg of the L extends considerably perpendicularly to the first leg, and the free ends of the L-shaped structural elements are secured to the main cabin structure.

So as not to increase the load suspended from the top part of the main structure of the airplane for no good reason, the raised aisle is beneficially supported by the cabin bridge. For the cabin bridge, this is not a great surcharge. Indeed, the raised aisle may be replacing a row of seats and the weight of the components permitting the creation of a raised aisle should not be greater than the weight of a row of seats, even if it is coach class seats.

One can provide for a staircase to access each of the ends of the raised aisle. This staircase can be turned longitudinally in the cabin, or else, transversally. In the case of a transversal staircase, it can be double (with access to the aisle from the left and the right). One might also imagine a curved staircase. A ladder could also permit access to the aisle. However, this solution, while possible and cheaper than a staircase, is initially not the preferred solution because it does not permit for quick evacuation of the passengers from the beds accessed by the raised aisle.

In a form of design, the raised aisle divides the cabin longitudinally in two longitudinal sections. In such an airplane, one finds then a "wall" that separates the cabin longitudinally in two. This permits having a aisle with a rather considerable height permitting the passengers accessing the beds to walk up straight without having to bend over. In this configuration with two longitudinal sections and when the cabin presents for instance seats that can be converted into beds and seats that cannot be converted into beds, the convertible seats are for instance all located in the same longitudinal section.

To free up maximum space for the passengers on the beds, passage ways for air ducts and tubing are beneficially provided in a bridge supporting structure.

DETAILED DESCRIPTION OF THE INVENTION

In a variation of the preferred design, storage spaces are provided under the raised aisle. This permits having luggage that is very accessible. In addition, a piece of luggage placed on the floor has a lesser weight than a classic piece of luggage stowed away on top. Since there is a lot of space under the raised aisle, this space can also be used to stow away carts (or trolleys) used by navigating personnel providing service to the passengers. It can also receive components secured to the floor, called monuments. For instance, this can be kitchens used for cabin service (generally called "galleys") or also storage space for receiving passenger coats and jackets (these spaces are generally designated by the English term "Coat stowage").

To free up maximum space for the passengers in terms of seats and beds, in the areas where beds are located above the seats, the ceiling of the bridge is preferably and considerably parallel to the bridge.

BRIEF DESCRIPTION OF THE DRAWINGS

Details and advantages of this invention shall appear even more from the description that follows, with reference to the attached schematic diagram, on which:

Illustration 1 is an overhead view of a cabin of an airplane having a layout according to the invention, and Illustrations 2 to 5 are views of the transversal sections of the airplane of illustration 1 for various configurations.

Figure 1:
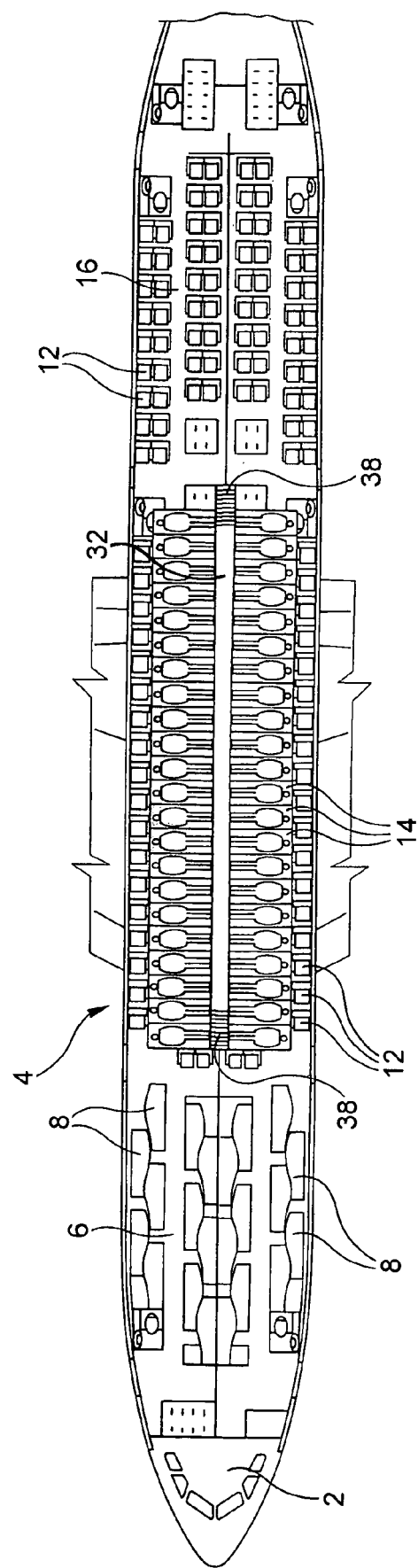
Figure 2:
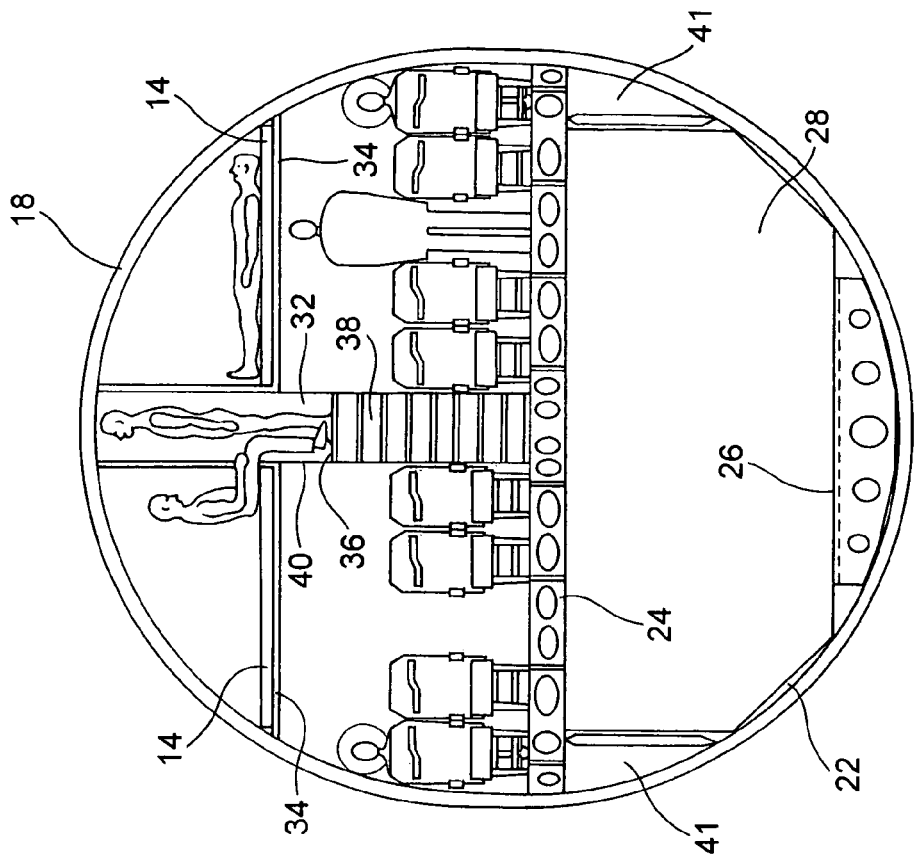
Figure 3:
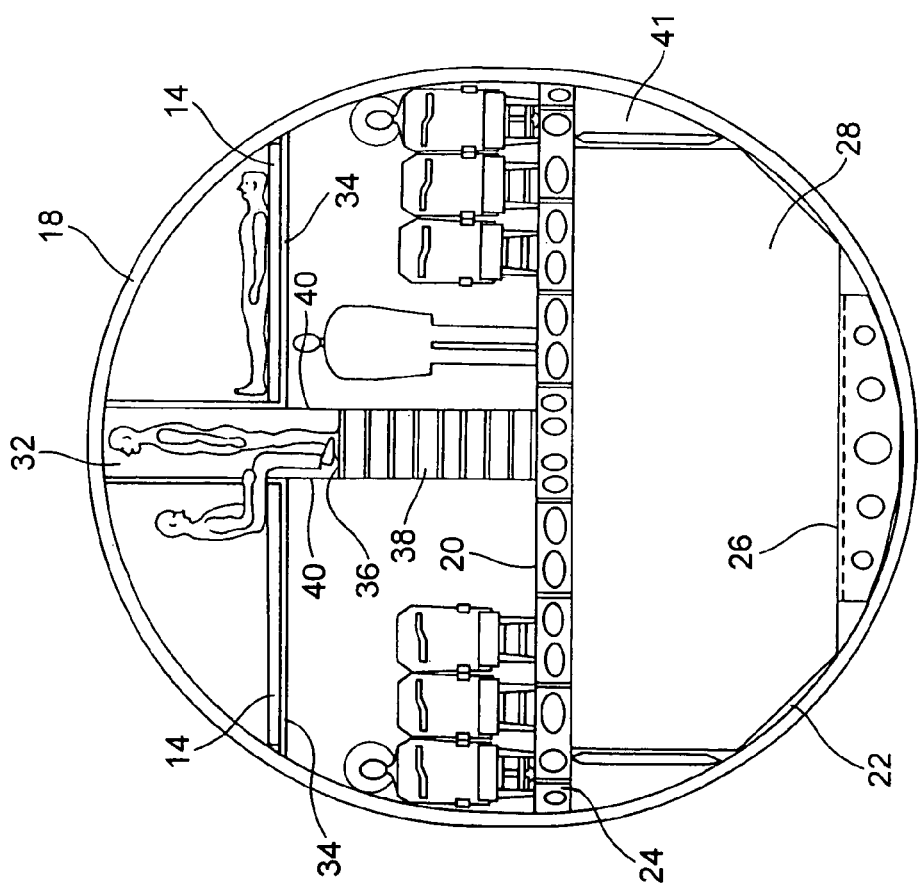
Figure 4:
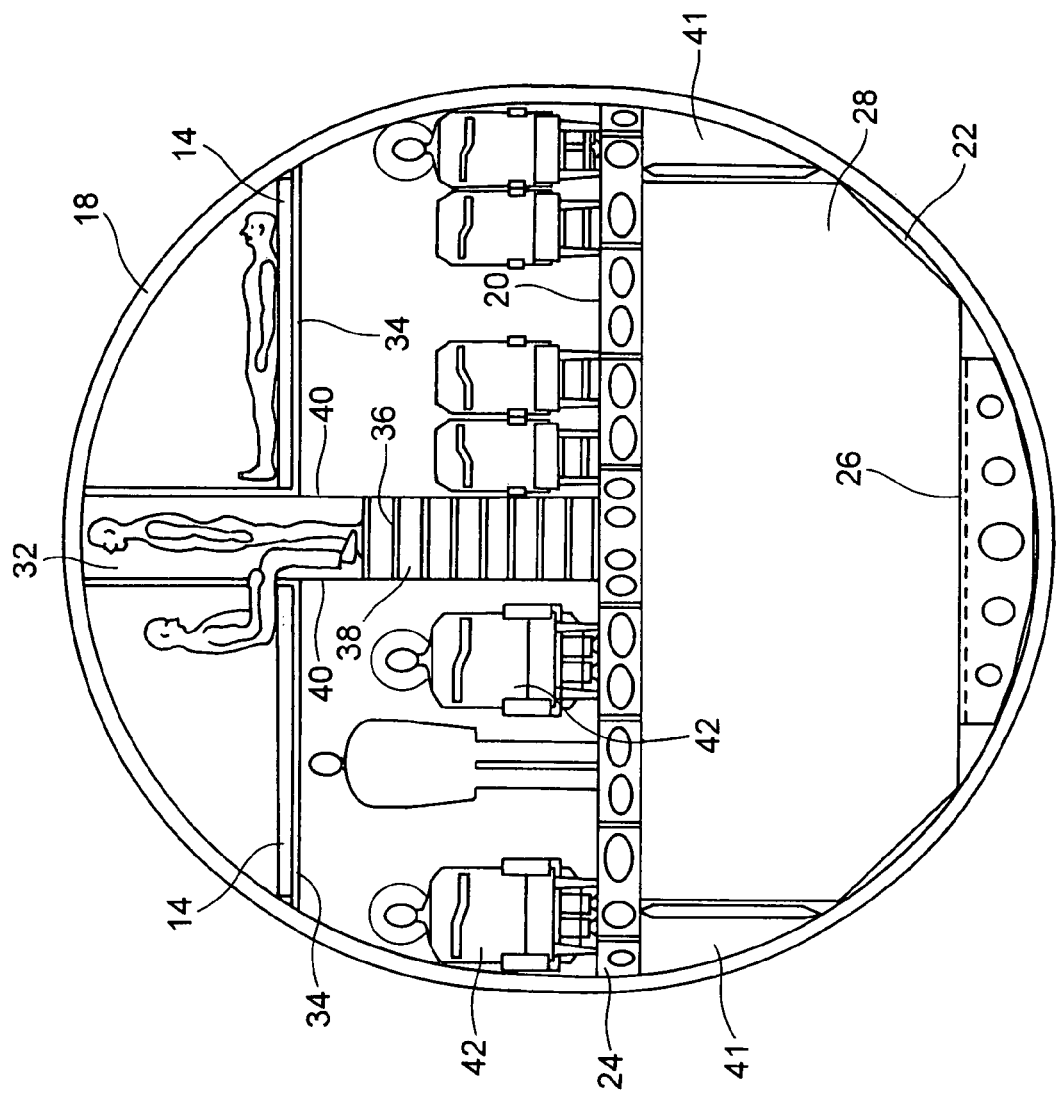
Figure 5:
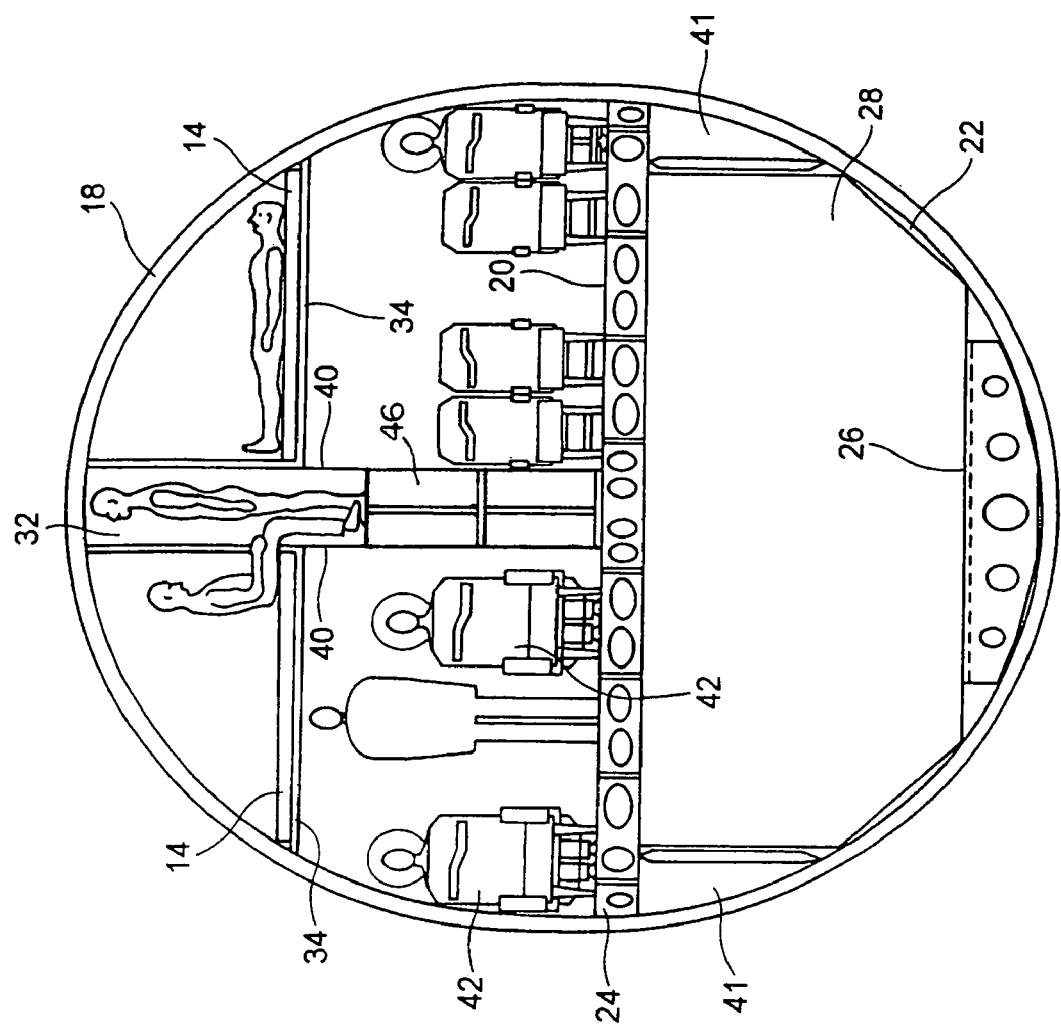

On illustration 1, one observes an airplane comprising a cockpit 2 in the front of the airplane and a cabin 4 that extends over the majority of this airplane.

In the front of cabin 4, there is a first compartment 6 in which individual passenger modules 8 are arranged. In each individual passenger module 8, there is a convertible seat that can receive a passenger in the seated and sleeping position. Other comfort accessories are also provided in the module. Compartment 6 is as such called here, a first class compartment.

Behind the first compartment 6, there is a second compartment 10 that includes on the one hand seats 12 (non convertible into beds) and on the other hand, sleepers 14. Seats 12 and beds 14 are arranged at different levels. As such, beds 14 are located above seats 12, with all seats 12 on the same level, corresponding to a level where the individual passenger modules 8 are located. This second compartment 10 is described in greater detail below.

Finally, in the back of cabin 4, there is a third compartment 16 where seats 12 are arranged similar to those of second compartment 10. These seats 12 are arranged at a same level as seats 12 of second compartment 10 and individual passenger modules 8 of first compartment 6.

Illustration 2 represents a cross section of the airplane fuselage of illustration 1, with the section carried out at the level of second compartment 10.

On illustrations 2 to 4, a main structure 18 of the plane is represented at the boundary of the cabin by a double line. That can be a classic airplane structure such as the one known to the expert in the field. In a classic manner, a bridge 20 extending longitudinally with respect to the plane separates cabin 4 by a luggage space 22. Bridge 20 is supported by a structure 24 consisting of among other beams secured to main structure 18. The luggage space 22 shows a floor 26 and is destined to receive in its portion at the level of the cross section, standardized containers 28.

In the rest of the description, it is assumed that bridge 20 is horizontal and extends for the same level over the full length and width of the airplane. It is also assumed that the cabin is located above the bridge while the luggage space is located below it.

In the top part of cabin 4, and more specifically of second compartment 10, beds 14 are located. The latter are arranged horizontally, in other words, in parallel to bridge 20 and they are positioned transversally with respect to the cabin. As one can see on illustration 1, here we have two rows of beds 14. These two rows are arranged on either side of a central aisle 32.

Beds 14 are supported by L-shaped supporting components 34. These supporting components 34 are arranged in such a way that one leg of the L extends horizontally and the other leg extends vertically upwards in cabin 4. The free ends of the L legs are each secured to a main structure 18 of the cabin. As such, two mezzanines are formed that extend longitudinally on both sides of the plane. Aisle 32 permits access to these mezzanines. Its has a floor 36 comparable to a foot bridge secured to bridge 20. As such, an elevated path is created with respect to bridge 20, in the center of cabin 4.

Access to this path is possible by two staircases 38, a staircase at each end of aisle 32. A lateral wall 40 ties floor 36 on either side of aisle 32 to beds 14. Aisle 32 is thus isolated from the rest of second compartment 10.

Floor 36 rests preferably on storage bins 46, as shown in illustration 5. The latter can be used to hold the luggage of the passengers in second compartment 10. Under floor 36, there is sufficient space to store all the luggage of the passengers traveling in the second compartment if one takes into account the maximum allowable size of the luggage usually authorized to be carried inside the cabin. Also, there is even sufficient space to stow away under floor 36 galleys usually used by commercial navigating personnel to perform services on board the plane. The presence of this stowage space permits eliminating storage bins that are usually found on top of the cabin. Likewise, in the top part of the cabin, more space is available and this space is used for the comfort of the passenger occupying beds 14.

To free up even more space on top of cabin 4, structure 24 carrying bridge 20 is organized in such a way to permit passage of various ducts and conduits. As such, under bridge 20, in structure 24, for instance, electrical bundles, hydraulic conduits and air ducts are installed. Air ducts for the ventilation of the cab can be located in luggage storage areas 22, immediately under structure 24 that carries bridge 20 and near the outside wall of the plane. The location that receives these air ducts is identified by reference 41. These conduits then pass between the structural rods and the skin of the aircraft. For the ventilation of the top part of cabin 4, conduits can be provided along the transversal structural elements called frames to feed air into this part of cabin 4.

Illustration 3 shows a variation of the design of illustration 2. The difference here is that there are three front seats on each side of central aisle 32 at the level of bridge 20 while, as can be seen on the drawing, there are four in the configuration of illustration 2.

The configuration shown on illustration 4 is original by the fact that convertible seats 42 are located on one side of central aisle 32 while on the other side of this central aisle, there are seats 12 corresponding to the seats that are usually found in the coach section compartments. In general, in a plane with a single bridge, the seats for the coach class are arranged in the back of the cabin while the first and business classes are arranged in the front of the cabin. Here, first class and business class passengers are located to the right of the plane, with respect to the direction of operation of the plane (in other words, to the left on illustration 4) and the coach class passengers to the left of the plane. As such, during embarking, the coach class passengers do no longer pass through the first class and business class compartments and are directed directly towards the coach class compartment.

The solution proposed above for arranging beds in an airplane, for the first time, permits offering travel lying down to a large number of passengers in coach class. For sure, there are fewer beds than seats proposed in coach class but one could for instance consider having two different price levels in coach class: with or without beds.

The solution proposed for having beds does not create any considerable excess load for the plane. Indeed, as was indicated above, the solution proposed leads to the removal of all storage bins on top. These binds represent a rather considerable weight. A very considerable weight gain is achieved by replacing these luggage bins usually stowed on top in bins or racks located on the bridge and serving as support for floor 36 of central aisle 32.

The solution proposed permits having an aisle 32 in which passengers can move around without having to bend. It is also possible to vacate the airplane within the period of time prescribed by the aeronautical codes.

The fact of eliminating the luggage bins usually located on top also permits freeing up space high up in the cabin. As such, beds 14 can be arranged at a distance from the bridge that is barely greater than the height of a man. The level of these beds can as such be considerably reduced with respect to the beds of the previous state of the art that are located in the top part of the cabin of an airplane. This reduction of the level of the beds allows among other for a greater width at the beds and permits to have up in the cabin, at a same level, two persons stretched out transversally in the direction of flight of the plane as well as a central aisle.

This invention is not limited to the forms of design described above as non-limiting examples. It also concerns all the variations of design within reach of the expert in the field, pursuant to the claims that follow.

The invention claimed is:

1. An airplane cabin used for transporting passengers comprising:
    a main structure being a structure of an airplane and enclosing a cabin;
    a bridge forming a flat surface on which seats are secured;
    an aisle extending longitudinally in cabin and elevated with respect to the bridge;
    a storage unit extending from the bridge to the aisle, the storage unit configured to divide the cabin into two longitudinal sections with seats arranged on both sides of the storage unit; and
    beds accessed by said aisle and arranged above the seats of the bridge,
    wherein the beds accessed by the aisle are arranged transversally with respect to the aisle and the two sides of the aisle.

2. The airplane cabin according to claim 1, wherein the beds are suspended on a side of the aisle to a principal structure of the cabin and are attached on an other side of the aisle to the main structure.

3. The airplane cabin according to claim 2, wherein the beds are supported by L-shaped structural components, with one leg of the L extending considerably in parallel to the bridge and presenting a length that is considerable equal to the length of a bed while the other leg of the L extends considerably perpendicularly to the first leg, and
    free ends of the structural components of the L shape are secured to the main structure of the cabin.

4. The airplane cabin according to claim 1, wherein the aisle is supported by the bridge of the cabin.

5. The airplane cabin according to claim 1, wherein a staircase gives access to each of ends of the aisle.

6. The airplane cabin according to claim 1, wherein the aisle divides the cabin longitudinally into two longitudinal sections.

7. The airplane cabin according to claim 6, wherein the cabin includes seats that can be converted into beds and seats that cannot be converted into beds, and
    seats convertible into beds are located in a same longitudinal section.

8. The airplane cabin according to claim 1, wherein passage ways for air conduits and ducts are provided in a structure supporting the bridge.

9. The airplane cabin according to claim 1, wherein the areas where the beds are located above the seats and the ceiling of the bridge is considerably parallel with bridge.

10. An airplane cabin used for transporting passengers comprising:
    a main structure being a structure of an airplane and enclosing a cabin;
    a bridge forming a flat surface on which seats are secured;
    an aisle extending longitudinally in cabin and elevated with respect to the bridge;
    storage means for storing luggage, the storage means extending from the bridge to the aisle, the storage means dividing the cabin into two longitudinal sections with seats arranged on both sides of the storage means; and
    beds accessed by said aisle and arranged above the seats of the bridge,
    wherein the beds accessed by the aisle are arranged transversally with respect to the aisle and the two sides of the aisle.

11. The airplane cabin according to claim 10, wherein the beds are suspended on a side of the aisle to a principal structure of the cabin and are attached on an other side of the aisle to the main structure.

12. The airplane cabin according to claim 11, wherein the beds are supported by L-shaped structural components, with one leg of the L extending considerably in parallel to the bridge and presenting a length that is considerable equal to the length of a bed while the other leg of the L extends considerably perpendicularly to the first leg, and
    free ends of the structural components of the L shape are secured to the main structure of the cabin.

13. The airplane cabin according to claim 10, wherein the aisle is supported by the bridge of the cabin.

14. The airplane cabin according to claim 10, wherein a staircase gives access to each of ends of the aisle.

15. The airplane cabin according to claim 10, wherein the aisle divides the cabin longitudinally into two longitudinal sections.

16. The airplane cabin according to claim 15, wherein the cabin includes seats that can be converted into beds and seats that cannot be converted into beds, and
    seats convertible into beds are located in a same longitudinal section.

17. The airplane cabin according to claim 10, wherein passage ways for air conduits and ducts are provided in a structure supporting the bridge.

18. The airplane cabin according to claim 10, wherein the areas where the beds are located above the seats and the ceiling of the bridge is considerably parallel with bridge.

* * * * *

UNITED STATES PATENT AND TRADEMARK OFFICE
CERTIFICATE OF CORRECTION

PATENT NO. : 7,290,735 B2 Page 1 of 1
APPLICATION NO. : 11/188703
DATED : November 6, 2007
INVENTOR(S) : Saint-Jalmes et al.

It is certified that error appears in the above-identified patent and that said Letters Patent is hereby corrected as shown below:

On the title page, Item (30), the Foreign Application Priority Data has been omitted. Item (30) should read:

-- (30)      Foreign Application Priority Data

Jul. 26, 2004   (FR)  ............................04 08239 --

Signed and Sealed this

Fourth Day of March, 2008

JON W. DUDAS
*Director of the United States Patent and Trademark Office*